United States Patent [19]

Runstetler

[11] 3,845,751
[45] Nov. 5, 1974

[54] OIL PURIFYING MEANS EMPLOYED IN CONNECTION WITH INTERNAL COMBUSTION ENGINES

[76] Inventor: Roy H. Runstetler, 650 Redland Dr., Grants Pass, Oreg. 97526

[22] Filed: Aug. 30, 1973

[21] Appl. No.: 392,972

[52] U.S. Cl.............. 123/196 A, 210/168, 210/180
[51] Int. Cl.............................................. F01m 1/06
[58] Field of Search.................. 210/180, 539, 168; 123/196 A, 196 AB; 159/29; 184/6.24

[56] References Cited
UNITED STATES PATENTS

| | | | |
|---|---|---|---|
| 1,424,998 | 8/1922 | Fenton | 123/196 A |
| 1,712,944 | 5/1929 | Summers | 123/196 A |
| 2,102,430 | 12/1937 | Mcleod | 210/539 |
| 2,346,042 | 4/1944 | Morris | 210/180 |
| 2,392,548 | 1/1946 | Pogue | 123/196 A |
| 2,428,939 | 10/1946 | Morris | 210/180 |
| 2,909,284 | 10/1959 | Watkins | 210/180 |
| 3,616,885 | 11/1971 | Priest | 210/180 |

Primary Examiner—Samih N. Zaharna
Assistant Examiner—Robert H. Spitzer
Attorney, Agent, or Firm—Clarence M. Crews

[57] ABSTRACT

A simple, compact and inexpensive oil purifying device is provided in the line which returns oil from the cylinder or cylinders to the sump of an internal combustion engine for reuse. The oil is conducted in a thin film through a chamber which is heated by exhaust gases for the evaporation of entrained water and fuel. The unevaporated oil is returned through the chamber and a filter to the sump for reuse and the water and fuel vapors are delivered to the intake manifold. At the water and fuel vapor outlet of the chamber a float valve is provided for blocking discharge of oil into the intake manifold when, and if, the normal oil outlet of the chamber becomes blocked.

3 Claims, 4 Drawing Figures

PATENTED NOV 5 1974 3,845,751

OIL PURIFYING MEANS EMPLOYED IN CONNECTION WITH INTERNAL COMBUSTION ENGINES

It is a recognized fact that lubricating oil, pumped from the sump of an internal combustion engine to the cylinders and other operating parts of the engine, becomes polluted by solids, diluted by fuel and emulsified by, or mixed with, water that finds its way into the system as a product of combustion. Solids tend to be abrasive, while dilution and emulsification impair the lubricating properties of the oil. Solids can be, and are, satisfactorily taken care of by filters.

It has been proposed to eliminate the polluting water and fuel content of the lubricating oil by evaporation, but the means heretofore proposed for that purpose have had one or more of several serious faults, such as being complicated and expensive, too bulky for the space available, or inadequate and ineffective for their intended purpose.

It is the primary purpose of the present invention to provide simple, compact, inexpensive and effective means for causing all of the oil en route to the sump to pass through a small water and fuel evaporating chamber for impartial exposure to the heat of said chamber and consequent substantial restoration to its original condition so far as liquid pollutants are concerned.

It is a feature of the invention that the oil undergoing treatment is caused to flow down a uniformly sloping, heated floor of the chamber, impeded at intervals by damming formations of uniform depth, for causing the oil to be spread out so that the full width of the chamber will be uniformly utilized.

The chamber is desirably heated through its floor by exhaust gases from the engine, and the resultant water and fuel vapors are discharged to the intake manifold of the engine.

It is a feature that the fuel treating chamber is equipped with a normally inactive, overflow blocking, float valve, which will automatically become effective to prevent delivery of oil to the intake manifold in the event of stoppage in the oil return line between the evaporating chamber and the sump.

Other objects and advantages will hereinafter appear.

In the drawing forming part of this specification,

Figure 1:
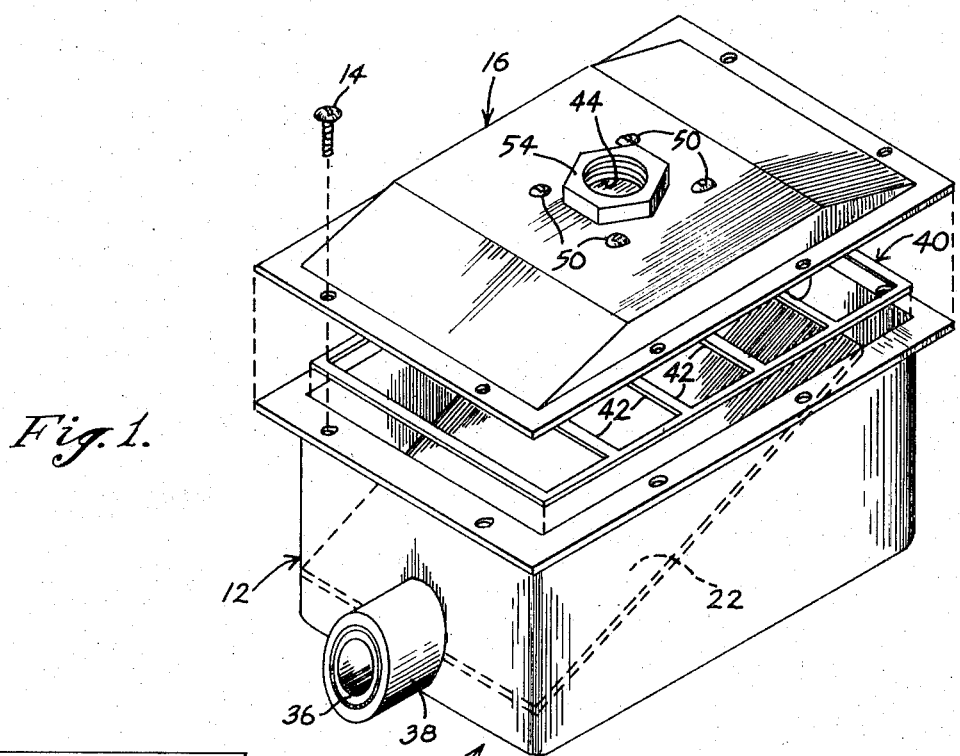
FIG. 1 is an exploded, perspective view of the body, cover and a damming grid which form significant parts of the evaporating unit.

It is well known that every internal combustion engine of one or more cylinders has an intake manifold or conduit for the supplying of a combustible mixture to the cylinder or cylinders, an exhaust manifold or conduit for disposing of spent gases, and an oil circulating system for conveying lubricating oil from a sump to the operating parts and for returning the used oil to the sump. Since these details are essential, but vary widely, no attempt is made herein to illustrate a complete engine, but connections to a unit 10, which is at the heart of the invention, are shown only in fragmentary form.

The unit 10 comprises a small box-like prismatic metallic body member 12 which is provided, through screws 14, with a detachable cover 16. The unit is divided into a lower chamber 18 and an upper chamber 20 by a sloping partition wall 22 which slopes from end to end of the unit and which forms a roof for the lower chamber 18 and a floor for the upper chamber 20.

A coupling 24 which forms part of a bypass line for hot exhaust gases is threaded onto a nipple 26 at the intake end of the lower chamber through which exhaust gases are delivered to the lower chamber 18 for the purpose of heating the upper chamber 20 through the sloping partition wall 22. The exhaust gases are returned to the exhaust line through a nipple 28 which is affixed to the floor of the lower chamber and a coupling 30. The lower chamber diminishes in height from the intake end to the opposite end of the unit.

The upper chamber portion of the body member 12 has affixed to it a nipple 32 which is connected to the oil return line through a coupling 34. All the oil which is being returned to the sump is delivered through the nipple 32 into the upper right hand end of the upper chamber 20.

The oil flows down the sloping partition wall 22 which forms the floor of the upper chamber and is discharged to the line which leads to the sump through a nipple 36 and a coupling 38.

The lower chamber is a heating chamber, normally heated by exhaust gases to a temperature above the boiling points of any water or fuel that may be entrained in the oil. The heating chamber having a cross-section which is larger than the cross-section of the exhaust gas intake and discharge ports.

The partition wall or chamber floor 22 which desirably slopes uniformly from right to left extends evenly across the unit. It is desirable, in the interest of efficiency, to cause the oil to be spread as evenly as possible throughout the width of the upper chamber, so that the entire width of the unit will be utilized.

To this end a damming grid 40, substantially coextensive in external dimensions with the wall 22 is laid on the wall 22. The grid 40 includes, besides a peripheral framework, a series of thin damming crossbars 42 which tend to cause overflow of oil at each crossbar to occur evenly throughout the length of the crossbar. The grid could be composed of shaped wire, but it is preferably made as a very thin metallic stamping.

As has been indicated, the purpose in providing the unit 10 is to free the oil from any fuel with which it may be diluted and from any water with which it may have become mixed or by which it may be emulsified. The unit has been found to function very efficiently in the attainment of this objective.

The cover 16 which forms the lid of the upper chamber is formed with a discharge opening 44 through which the water and/or fuel vapors are delivered to the intake manifold of the engine.

Since a stoppage in the oil return line after the chamber 20 could cause objectionable accumulation of oil in the chamber 20 and overflow into the intake manifold, a cage 46 having four arms 48 is desirably secured to the underside of the cover, in line with the opening 44 by screws 50. A float valve 52 is loosely confined in the cage in an inactive condition so long as the upper chamber does not become filled with oil. Should the upper chamber become filled with oil the float valve 52 will move upward and block the exit opening 44.

A nut 54, soldered to the outer face of the cover 16 and surrounding the exit opening 44, provides a means for connecting the upper chamber with a line, not shown, that leads to the intake manifold.

Figures 2, 3:
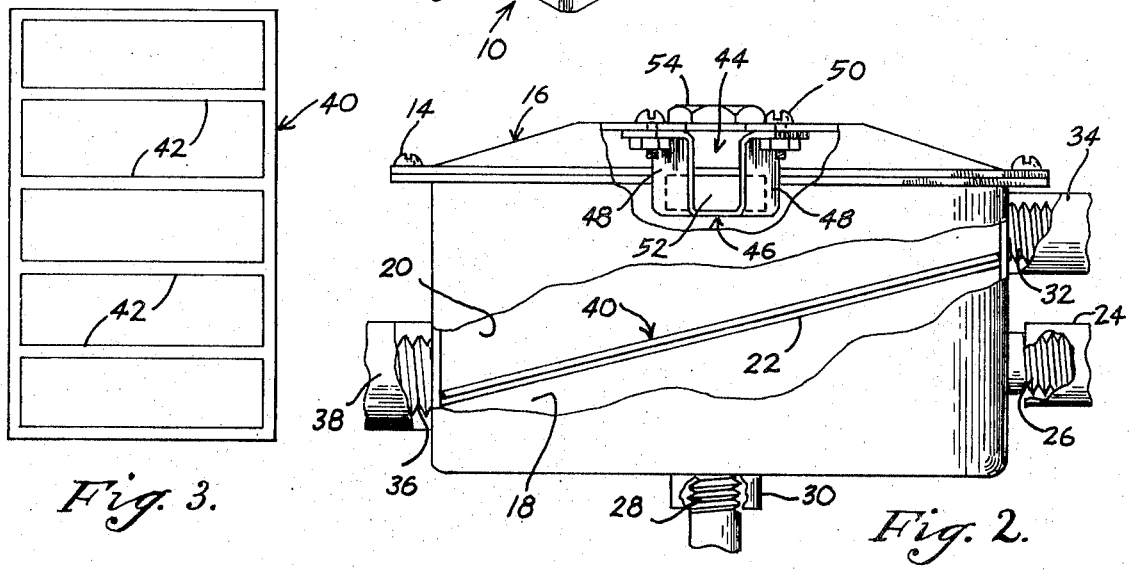
FIG. 2 is a fragmentary view in side elevation, partly broken away, of the evaporating unit.
FIG. 3 is a plan view of a damming grid which rests upon the sloping floor of the evaporating chamber.
Figure 4:
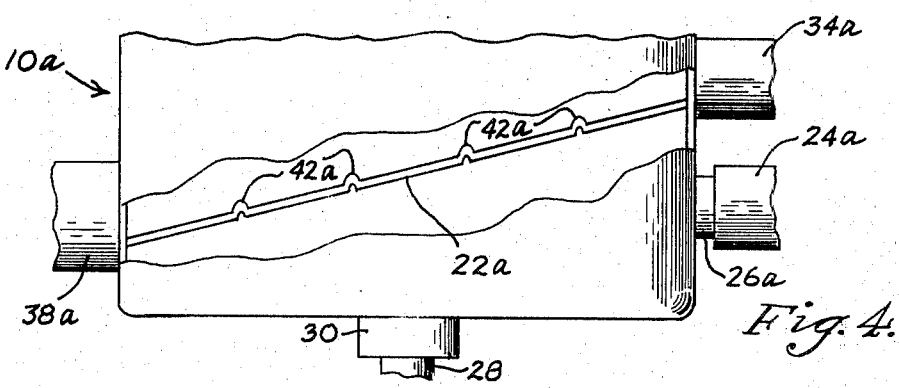
FIG. 4 is a fragmentary view, partly broken away, of a modified unit in which the grid is omitted and the floor of the heating chamber has damming ribs of uniform height formed integrally with it.

The unit 10a of FIG. 4 may desirably be in all respects like the unit 10 of FIGS. 1 to 3, save that the grid 40 with its damming crossbars 42 is omitted and damming ribs 42a of uniform height, integral with the wall member 22a, are struck up at intervals to perform the same damming function performed by the crossbars 42 of the grid 40.

I have described what I believe to be the best embodiment of my invention. What I desire to secure by letters patent, however, is set forth in the appended claims.

I claim:

1. An oil purifying unit for incorporation in an internal combustion engine, which engine has an exhaust line for discharging hot exhaust gases produced as an incident of its operation, and contaminates with water and fuel the lubricating oil employed by it, said unit comprising, when so incorporated, a prismatic box-like structure which is divided into
   a. an upper engine oil transmitting and purifying, water and fuel evaporating chamber, interposed in an oil return line of the engine and having a high oil intake port at an oil intake end, a low oil discharge port at the opposite or oil discharge end, and a vapor discharge port for disposing of vapors produced in said chamber, through which chamber the engine oil may be caused to travel in a broad, thin layer by gravity from end to end under flow conditions which are essentially identical from side to side of the chamber, and
   b. a lower hot-exhaust-gas-transmitting, heat supplying chamber interposed in an exhaust bypass line of the engine said heat supplying chamber having widely separated intake and discharge ports for the hot exhaust gases located, respectively, in an upstanding wall and in the floor, of the chamber, the crosssection of said lower heat supplying chamber being larger than the cross-section of the intake and discharge ports,
   c. the division of the box-like structure into upper and lower chambers being effected by a thin, generally flat, imperforate, metallic dividing wall which forms a heat transmitting floor for heating the upper chamber and a roof for the lower chamber, and which extends evenly from side to side of the box-like structure throughout its length, but slopes downward continuously and uniformly from the oil intake end of the upper chamber to a level at the oil discharge end thereof, not substantially below the lower extremity of the oil discharge port, the unit being further characterized by the fact that oil-spreading, damming means are provided at intervals along the upper surface of the sloping dividing wall for prolonging the transmission of the oil through the upper chamber, for collecting the oil in a succession of shallow pools, and for promoting uniformity of oil distribution throughout the width of the upper chamber, each of which damming means extends at an even and uniform height throughout the width of the upper chamber.

2. An oil purifying unit as set forth in claim 1 in which the damming means take the form of upwardly displaced ribs which are integral parts of the sloping dividing wall.

3. An oil purifying unit as set forth in claim 1 in which the damming means take the form of a separate grid substantially coextensive in bounding dimensions with the dividing wall, which simply rests loosely on the dividing wall.

* * * * *